July 7, 1925.  1,544,671

A. D. MAURY

BAIT CASTING REEL

Filed Jan. 12, 1923

INVENTOR
Alfred D. Maury
BY
Thomas L. Wilder
ATTORNEY

Patented July 7, 1925.

1,544,671

UNITED STATES PATENT OFFICE.

ALFRED D. MAURY, OF ILION, NEW YORK, ASSIGNOR TO MARTIN AUTOMATIC FISHING REEL CO., INC., OF MOHAWK, NEW YORK, A CORPORATION OF NEW YORK.

BAIT-CASTING REEL.

Application filed January 12, 1923. Serial No. 612,288.

*To all whom it may concern:*

Be it known that I, ALFRED D. MAURY, a citizen of the United States, residing at Ilion, in the county of Herkimer and State of New York, have invented certain new and useful Improvements in Bait-Casting Reels, of which the following is a specification, reference being had therein to the accompanying drawing.

The object of the invention is to provide a fishing reel for bait casting that will have an attachment adapted to prevent the tangling of the line when loops are formed caused by backlash in casting.

Figure 1:
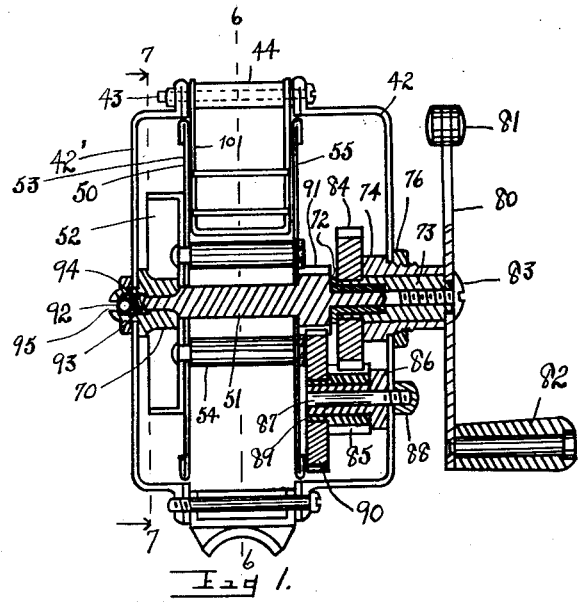
Fig. 1 is a central vertical section of a reel showing the attachment affixed.

In order to counteract against what is generally known as backlash, an attachment that may be applied to any line casting reel has members 42′, 42 that are held in given relation by bolts 43 and spacing sleeves 44. In this construction, however, the casing encloses a line spool 50 which revolves with a rotary spindle 51. A brake drum 52 is riveted to wall 53 of spool 50 by means of the extended ends of spacing rods 54. Rods 54 are employed to hold walls 53 and 55 in assembled position.

Spindle 51 has a rotary bearing at one end in member 70 mounted to wall 42 of the casing. The opposite end of spindle 51 has a rotary bearing in flanged collar or sleeve 72 mounted to turn independently of and within sleeve 73 that is in turn carried to turn independently thereof and within flanged collar 74 projecting through an aperture formed in wall 42 of the casing and held therein by nut 76 mounted to the threaded part of collar 74.

Arm 80, carrying at one end a balancing weight 81 and at the other a handle 82, is attached, whereby to rotate sleeve 73, by a screw 83. Moreover, the inner reduced end of sleeve 73 has mounted thereon and in a manner to turn therewith spur gear 84 that meshes with pinion 85. Pinion 85 is mounted on flanged collar 86 and is adapted to turn independently thereof. Collar 86 has a bearing upon headed bolt 87 that is mounted to wall 42 of the casing and held in place by nut 88.

The hub of pinion 85 is reduced and extended laterally at 89. Spur gear 90 is fixed thereto in a manner to turn therewith. Spur gear 90 is in mesh with pinion 91 formed integral with spindle 51. A dust proof cover is formed by ball 92 held yieldingly in place by coiled spring 93 that contacts at one end against a shoulder formed on member 70 and at the other against ball 92 housed within recess 94 formed in member 70. Aperture 95 is made in the end of member 70, whereby oil can be introduced to the bearing. Said aperture 95 being normally closed by ball 92.

The turning of the crank handle 82 will cause the turning of spur gear 84, pinion 85, spur gear 90, pinion 91, and, therefore, spindle 51, which carries to rotate therewith line spool 50. When casting, the rotation of spool 50 can be stopped at the end of the cast by pressing upon finger piece 100 attached to bell crank lever 61, whereby to rock said lever 61 to bring brake shoe 60 into contact with the rotating exterior surface of drum 52, thereby stopping said rotation as well as that of line spool 50, which rotates with said drum 52.

It is well known that when a cast of a fishing line is made, spool 50 will acquire considerable momentum especially at the end of the cast, so that if the rotation of the spool is not checked when the plug or sinker, not shown, attached to the fishing line, strikes the water, the line becomes slack and loops are thrown from the spool. These loops become tangled causing backlash.

Blacklash, therefore, is counteracted against by attaching a wire 101 bent in the form of a U and having each of its free ends wound about one of the spacing sleeves 44 used between members 42′, 42 of the casing. Wire 101 is adapted to swing freely on sleeve 44 and has cross bars 102 and 103 attached thereto, which cross bars are adapted to rest upon the fishing line.

Figure 2:
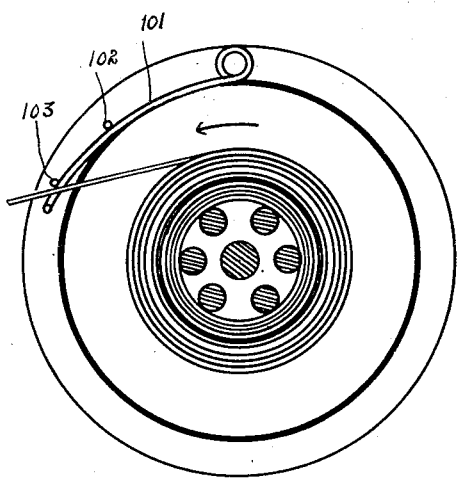
Fig. 2 is a section taken on the line 6—6 of Fig. 1.
Figure 3:
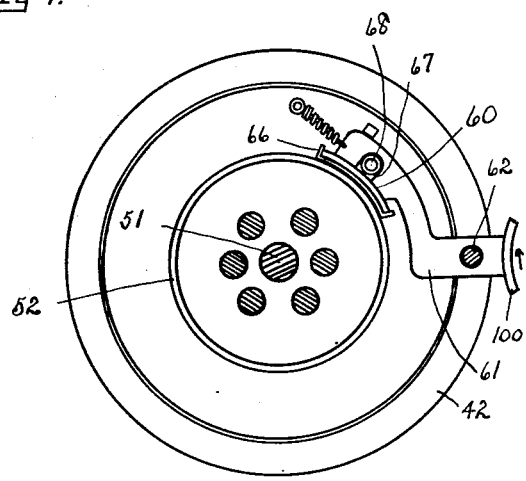
Fig. 3 is a section taken on the line 7—7 of Fig. 1 and looking in the direction of the arrows.

The operation of the wire is as follows: At the end of the cast, line spool 50 will be rotating in the direction indicated by the arrow in Fig. 2. Immediately the line becomes slack, as the plug strikes the water, wire 101 will drop down by force of gravity on spool 50. As loops are formed, said wire will cause the loops to be wound evenly on the spool although in the opposite direction from that in which said loops were formed in the first instance. A pull manually thereafter on the line will straighten out said line, whereupon it can be rewound in the proper direction without snarls therein.

Having thus described my invention what I claim as new and desire to secure by Letters Patent is:

1. In a bait casting reel, a U shaped wire pivotally mounted to said reel and said U-shaped wire having cross bars for preventing the tangling of the line on said spool.

2. In a bait casting reel, a U-shaped wire removably mounted to said reel and said U-shaped wire having cross bars thereon, whereby to counteract against any backlash of the fishing line.

3. In a bait casting reel, a U-shaped wire having its ends bent in the form of circles to engage said reel in a pivotal manner, and said U-shaped wire having means thereon, whereby to counteract against backlash of the fishing line.

4. In a bait casting reel, a wire bent in a U-shaped manner and having its ends formed to engage said reel and a cross bar attached to said wire, whereby to counteract against any backlash of the fishing line.

5. In a bait casting reel, a U-shaped wire bent to conform to the curvature of said reel, and having its ends formed into loops, whereby to engage said reel in a pivotal manner, a cross bar attached to said wire to aid in preventing the tangling of the line on said spool, and means for removably mounting said wire to said reel.

In testimony whereof I have affixed my signature.

ALFRED D. MAURY.